(12) United States Patent
Jauss

(10) Patent No.: US 8,126,636 B2
(45) Date of Patent: Feb. 28, 2012

(54) METHOD OF OPERATING AN INTERNAL COMBUSTION ENGINE ARRANGEMENT

(75) Inventor: Andreas Jauss, Westernohe (DE)

(73) Assignee: GM Global Technology Operations LLC, Detroit, MI (US)

( * ) Notice: Subject to any disclaimer, the term of this patent is extended or adjusted under 35 U.S.C. 154(b) by 217 days.

(21) Appl. No.: 12/303,357

(22) PCT Filed: May 30, 2007

(86) PCT No.: PCT/EP2007/004784
§ 371 (c)(1),
(2), (4) Date: Oct. 22, 2009

(87) PCT Pub. No.: WO2007/140912
PCT Pub. Date: Dec. 13, 2007

(65) Prior Publication Data
US 2010/0294250 A1    Nov. 25, 2010

(30) Foreign Application Priority Data
Jun. 2, 2006   (DE) .......................... 10 2006 025 857

(51) Int. Cl.
*F02M 21/02* (2006.01)
*F02B 7/00* (2006.01)
*F02D 41/26* (2006.01)

(52) U.S. Cl. ........ 701/107; 123/525; 123/511; 123/431; 123/575

(58) Field of Classification Search .......... 701/103–105, 701/107; 123/27 GE, 525, 526, 575, 431, 123/457, 460, 506, 510, 511, 529, 198 D
See application file for complete search history.

(56) References Cited

U.S. PATENT DOCUMENTS

| | | | |
|---|---|---|---|
| 6,568,375 B2 * | 5/2003 | Ishikawa et al. | 123/527 |
| 6,629,544 B2 * | 10/2003 | Nakajima et al. | 137/505 |
| 2004/0250797 A1 | 12/2004 | Shetley | |
| 2007/0199539 A1 * | 8/2007 | Lennox et al. | 123/304 |
| 2009/0301443 A1 * | 12/2009 | Kojima et al. | 123/513 |

FOREIGN PATENT DOCUMENTS

| | | |
|---|---|---|
| CA | 2532775 A1 | 4/2006 |
| DE | 10150952 C1 | 10/2003 |
| EP | 1255033 A2 | 11/2002 |
| JP | 8135513 A | 5/1996 |

* cited by examiner

*Primary Examiner* — Hai H Huynh
(74) *Attorney, Agent, or Firm* — Ingrassia Fisher & Lorenz, P.C.

(57) ABSTRACT

An arrangement includes, but is not limited to an internal combustion engine, a pressure reducer that reduces gas pressure of gaseous fuel for the engine. The reducer connects on a high-pressure side to a gas tank and connects on the low-pressure side to a controllable gas injection valve regulating the gas flow. A high-pressure shutoff valve is on the high-pressure side and connected to the reducer to shut-off the gas flow from the gas tank. The high-pressure shutoff valve includes, but is not limited to a pilot valve with a small opening and a main valve with a large opening, and an electronic controller used at least for controlling the high-pressure valve and a gas injection valve. The pilot valve of the high-pressure valve opens in chronological order before the gas injection valve.

31 Claims, 1 Drawing Sheet

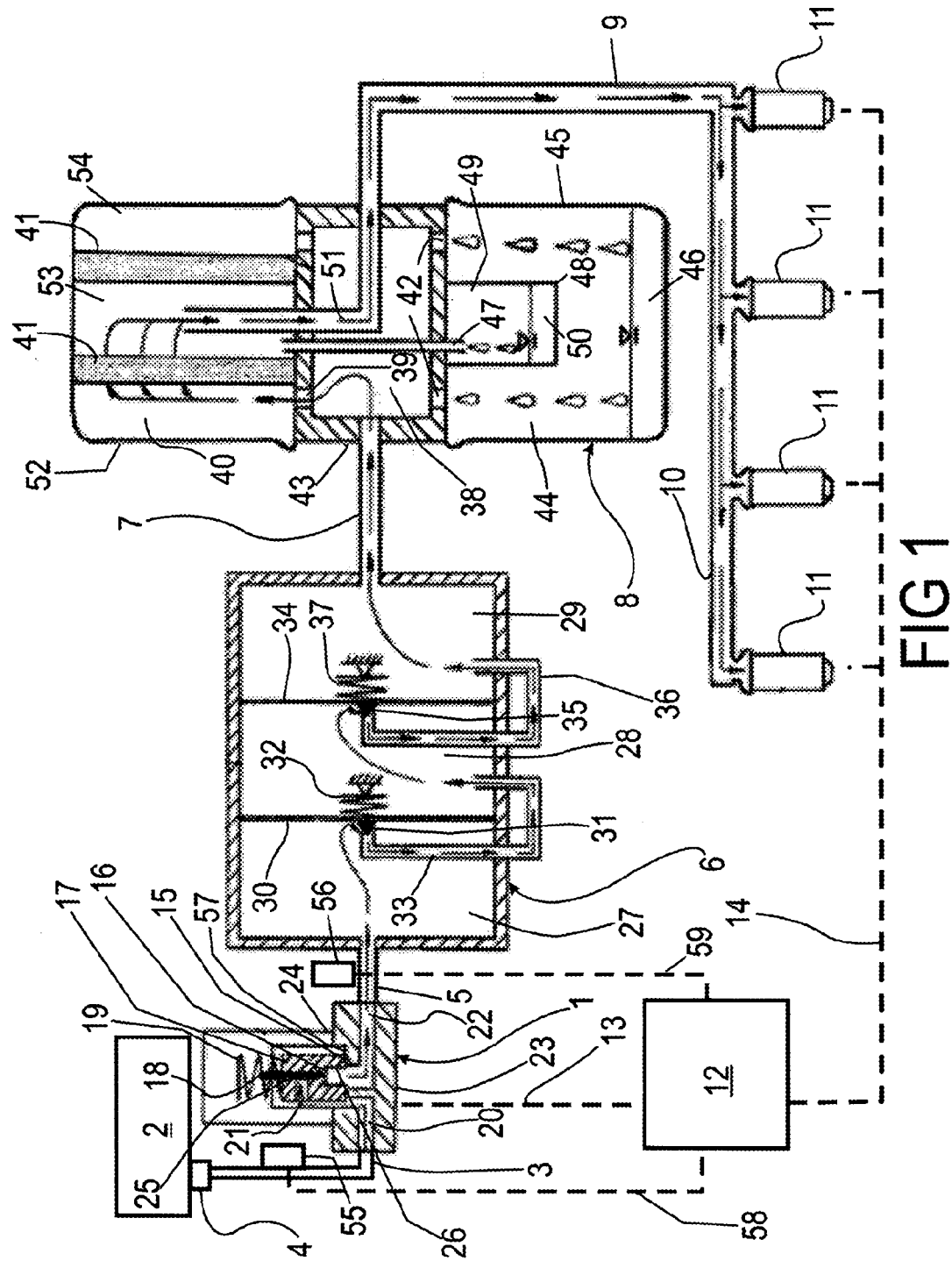

METHOD OF OPERATING AN INTERNAL COMBUSTION ENGINE ARRANGEMENT

CROSS-REFERENCE TO RELATED APPLICATIONS

This application is a U.S. National-Stage entry under 35 U.S.C. §371 based on International Application No. PCT/EP2007/004784, filed May 30, 2007, which was published under PCT Article 21 and which claims priority to German Application No. 102006025857.6, filed Jun. 2, 2006, which are all hereby incorporated in their entirety by reference.

TECHNICAL FIELD

The present invention lies in the technical field of drive technology and relates to a method for operating an internal combustion engine arrangement, in particular for driving a motor vehicle, and to an internal combustion engine arrangement which is suitable for carrying out the method.

SUMMARY

In view of dwindling oil reserves and increased demands of exhaust gas emissions, modern motor vehicles are increasingly being equipped with four-stroke internal combustion engines which can optionally be operated either liquid fuel (for example gasoline) or gaseous fuel.

Petroleum-based liquid gases such as auto gas (LPG=Liquefied Petroleum Gas), a byproduct of hydrogenation processes in oil refining which consists essentially of propane and butane, and natural gas (CNG=Compressed Natural Gas), which consists mainly of methane and is obtained by extraction from natural gas sources, are mainly used as gaseous fuels.

As the filling station network for gaseous fuels, in particular LPG and CNG, has however so far not yet been expanded sufficiently in the industrialized nations, most motor vehicles which can be operated with gaseous fuel are currently equipped with what are known as "bivalent" drives. Such motor vehicles are equipped with both a liquid fuel filling system and a gaseous fuel filling system, as well as corresponding feed and metering devices for feeding and metering the two fuel types to the internal combustion engine, and it is possible to switch over as required to operation with in each case one of the two fuel types manually or automatically by means of a control device. (For the sake of completeness it should be mentioned that vehicles with a gasoline tank up to a volume of approx. 15 l are referred to as vehicles which can be operated in a "monovalent-plus" manner.) It is therefore for example provided in such motor vehicles which can be operated in a bivalent (or monovalent-plus) manner for an automatic switchover from gaseous fuel operation to liquid fuel operation to take place as soon as the contents of the gas tank fall below a pre-definable threshold value.

If motor vehicles are operated with liquid gas (for example LPG), which is stored in liquid form in the gas tank, it is usually necessary to vaporize the liquid gas in order to prepare the mixture, which usually takes place in a combined vaporizer/pressure reducer which is connected in a fluid-conducting manner to the gas tank and is also used to set a gas pressure of the vaporized liquid gas which, is suitable for operating the internal combustion engine. (For the sake of completeness it should be noted that there are also LPG liquid injection systems.) Motor vehicles which can be operated with liquid gases are usually started with gasoline, since a satisfactory preparation of the mixture is not achieved with a cold engine and a cold cooling water circuit. As soon as a certain operating temperature is reached an automatic switchover to gas operation takes place.

When the motor vehicle is operated with a gaseous fuel which is stored in a gaseous form in the gas tank (for example CNG), it is necessary for storing a relatively large amount of gaseous fuel to compress the gaseous fuel under high pressure (for example 200-300 bar) in the gas tank without liquefying the gaseous fuel in the process. To be used the gaseous fuel must be depressurized to a low gas pressure which is suitable for operating the internal combustion engine and is usually below 10 bar, for example approx. 8 bar. The reduction in the pressure of the gaseous fuel takes place in a pressure reducer which is connected in a fluid-conducting manner to the gas tank, with an upstream high-pressure shutoff valve for shutting off the gas flow which is fed to the high-pressure side of the pressure reducer. Downstream of the pressure reducer the gaseous fuel which then has a low gas pressure is fed to respective gas injection valves (gas injectors) for injection into the intake of the internal combustion engine.

The problem arises with motor vehicles, which can be operated with gaseous fuel (for example CNG), which is stored in gaseous form that the gaseous fuel, which is compressed at a high gas pressure at the filling station can be contaminated with oil constituents of the compressor for compressing the gaseous fuel. The cause of this is the constantly increasing number of motor vehicles which can be operated with gaseous fuel and the resulting shorter time interval between consecutive filling operations of motor vehicles at the filling stations. As practical experience has shown, the relatively short time span between consecutive filling operations means that the operating temperature in the high-pressure stages of the compressor of the filling station increases sharply so that any lubricating oil present in the compressor vaporizes and gets with the gaseous fuel into the gas tank of the motor vehicle as a gas or for example also in the form of an aerosol.

If a gaseous fuel which has been contaminated with oil in such a manner is depressurized by means of the pressure reducer from for example 200 bar to a lower pressure of for example 8 bar, the gaseous fuel is cooled during the depressurization in the pressure reducer, as a result of which the entrained oil condenses out and is contained in liquid form in the gaseous fuel.

As a result of the flow, the now liquid oil in the gaseous fuel is distributed in non-uniform quantities on the individual gas injection valves and leads to different through-flow characteristics for the gaseous fuel in the gas injection valves, which can as a consequence lead to problems with respect to meeting exhaust requirements over distances, drivability problems and damage to parts (catalytic converter).

In order to avoid the problems caused with the contamination of gaseous fuel with gaseous oil, an oil separator is installed on the low-pressure side of the pressure reducer, which has the advantage that the oil separator only has to have pressure resistance to low pressure (for example 8 bar) and that the oil in liquid form which is condensed on the low pressure side is usually easier to separate.

In order to be able to separate and collect oil at least for the period of a conventional service interval of a motor vehicle, the oil separator must have a sufficiently large separation and collecting element, which however has the consequence that the volume of the fluid-conducting connection between the pressure reducer and the gas injection valves is considerably increased compared to a fluid-conducting connection without an oil separator, which contains for example just gas lines. This increase in volume can lead to problems during starting the operation of the internal combustion engine with gaseous fuel, in particular when switching over from liquid fuel operation (for example gasoline) to gaseous fuel operation (for example CNG), which is explained in more detail below.

As already explained, the gas pressure of the gaseous fuel is reduced in the pressure reducer from the high pressure necessary for storage in the gas tank to a low pressure (injection pressure), which is suitable for operation of the internal combustion engine. The pressure reducer can be configured to be single- or multi-stage, but usually comprises a high-pressure chamber which is connected in a fluid-conducting manner to the gas flow from the gas tank, which is under high pressure, and a low-pressure chamber which is connected in a fluid-conducting manner to the gas injection valves and from which the gas flow is fed to the gas injection valves. On the input side, that is, on its high-pressure side, the pressure reducer is usually connected in a fluid-conducting manner to a controllable high-pressure shutoff valve, by means of which the gas flow which is fed to the pressure reducer can be shut off. The generally electromagnetically operated high-pressure shutoff valve is furthermore used to reduce the pressure difference of the gas pressure of gaseous fuel on its input and output sides, in order in this manner to reduce the opening forces for opening the high-pressure shutoff valve and to allow its electromagnetic actuation on the basis of the electrical power of the vehicle electrical system of a motor vehicle (12 V or 24 V). To this end, the high-pressure shutoff valve is for example equipped with two valves with different opening cross-sectional areas, namely a pilot valve with a smaller opening cross-sectional area which only allows a comparatively low gas mass flow, which is only used to reduce the pressure difference on the input and output sides of the high-pressure shutoff valve and cannot maintain the operation of the internal combustion engine with gaseous fuel, and a main valve with a larger opening cross-sectional area which allows a comparatively high gas mass flow by means of which the operation of the internal combustion engine with gaseous fuel is made possible. The pilot valve can be designed in contrast to the main valve in such a manner that opening is possible by means of electromagnetic actuation on the basis of the electrical system of a motor vehicle.

In order to open the high-pressure shutoff valve, the pilot valve is first opened by electromagnetic actuation while the main valve is still closed. The gas flow which flows through the pilot valve fills the high-pressure chamber, which is connected in a fluid-conducting manner to the high-pressure shutoff valve, of the pressure reducer with gaseous fuel until the gas pressure difference across the high-pressure shutoff valve is equalized or is at least so low that it falls below a selectable gas pressure difference. Only then can the main valve of the high-pressure shutoff valve open by means of electromagnetic actuation, as a result of which an amount of gaseous fuel which is sufficient for operating the internal combustion engine can be fed to the intake of the internal combustion engine.

In operation with gaseous fuel, gaseous fuel flows through the pressure reducer, the low-pressure gas lines downstream of the pressure reducer, the oil separator and the gas injection valves. In the process negative gas pressures occur owing to flow resistances in the fluid-conducting line system downstream of the high-pressure shutoff valve.

If, in particular in a motorized drive which can be operated in a bivalent (or monovalent-plus) manner, a switchover is made from gaseous fuel mode to liquid fuel mode, the gas injection valves and the high-pressure shutoff valve have so far been simultaneously closed. In the process, the gas flow to the pressure reducer from the high-pressure shutoff valve is interrupted and the low-pressure line system is fed from the pressure reducer until a low-pressure-side (selectable) setting pressure is reached, which has the consequence that the gas pressure in the high-pressure chamber of the pressure reducer also falls.

If an oil separator is provided downstream of the pressure reducer in order to remove oil from the gaseous fuel, the "absorption volume", that is, the volume which is available to the fluid line, is greater than without an oil separator, so that in this case a much greater gas pressure difference occurs at the high-pressure shutoff valve when a switchover is made from gaseous fuel mode to liquid fuel mode.

If a switchover is then made back from liquid fuel mode to gaseous fuel mode, the high-pressure shutoff valve and the gas injection valves are usually opened again simultaneously. Owing to the high gas pressure difference prevailing across the high-pressure shutoff valve which can occur in particular with an oil separator installed, the case can arise in which, when the pilot valve is open and the main valve is closed, the gas flow flowing through the latter can no longer equalize the gas pressure difference by filling the high-pressure chamber of the pressure reducer or make it fall below a preset gas pressure difference because the gas injection valves allow gas fuel to flow into the internal combustion engine. It can have the particularly disadvantageous effect in this regard if the gas tank is no longer completely full but for example only a third full so that the gas pressure of the gaseous fuel in the gas tank is reduced.

If the gas pressure difference across the high-pressure shutoff valve can no longer be equalized by opening the pilot valve, or at least the gas pressure difference no longer falls below a preset gas pressure difference, it can happen that the main valve of the high-pressure shutoff valve can no longer be electromagnetically opened and thus the minimum gas mass flow which is necessary for operating the internal combustion engine can no longer be injected into the intake of the internal combustion engine. This has the consequence for example in a motor vehicle that it does not take on any more gas on switching over to gaseous fuel mode, which can lead to critical driving situations, for example while overtaking.

In contrast, the object of the present invention includes, but is not limited to providing a method for operating an internal combustion engine arrangement and an internal combustion engine arrangement which is suitable for carrying out the method, by means of which the described problems can be avoided. A particular situation should be avoided where a gas pressure difference across the high-pressure shutoff valve can no longer be equalized or the gas pressure difference can no longer at least fall below a preset gas pressure difference.

SUMMARY

This object is achieved according to the proposal of the invention by a method for operating an internal combustion engine arrangement and an internal combustion engine arrangement, which is suitable for carrying out the method with the features of the independent claims.

According to an embodiment of the invention, a method for operating an internal combustion engine arrangement and an internal combustion engine arrangement which is suitable for carrying out the method are disclosed. The internal combustion engine arrangement comprises an internal combustion engine, which can be operated with gaseous fuel, in particular an internal combustion engine, which can be operated in a bivalent (or monovalent-plus) manner with liquid fuel and gaseous fuel, a pressure reducer for reducing the gas pressure of the gaseous fuel which is fed to the internal combustion engine, which pressure reducer usually comprises a high-pressure chamber and a low-pressure chamber, wherein the pressure reducer is connected on the high-pressure side in a fluid-conducting manner via a gaseous fuel line to at least one gas tank for storing gaseous fuel, and wherein the pressure reducer is connected on the low-pressure side in a fluid-conducting manner by means of a gaseous fuel line to at least one controllable gas injection valve for regulating the gas flow of the gaseous fuel which is fed to the internal combustion engine, a controllable high-pressure shutoff valve, which is arranged on the high-pressure side of the pressure reducer and is connected in a fluid-conducting manner to the pressure reducer, for shutting off the gas flow of the gaseous fuel which is fed to the pressure reducer from the gas tank, wherein the high-pressure shutoff valve comprises a pilot valve with a relatively small opening cross-sectional area and a main valve with a relatively large opening cross-sectional area, and an electronic control device which is used at least for controlling the high-pressure shutoff valve and the at least one gas injection valve.

The high-pressure shutoff valve, which is arranged upstream of the pressure reducer and is connected in a fluid-conducting manner to the pressure reducer, is configured in such a manner that it has a pilot valve with a valve opening with a relatively small opening cross-sectional area and a main valve with a main opening with a relatively large opening cross-sectional area, wherein the pilot valve and the main valve can be controlled independently of each other by means of the electronic control device, that is, the opening times and durations can be defined. The pilot valve of the high-pressure shutoff valve is used to reduce a gas pressure difference between the input-side gas pressure and the output-side gas pressure of gaseous fuel of the high-pressure shutoff valve, in order in this manner to reduce the opening forces for opening the main valve and to allow an electromagnetic actuation of the main valve of the high-pressure shutoff valve. To this end, the opening cross-sectional area of the pilot valve is designed in such a manner that an electromagnetic actuation of the pilot valve is possible with an electrical power, which is provided by the electrical system of a motor vehicle (for example 12 V or 24 V). This generally leads to the main valve allowing a comparatively great gas mass flow, which is used to operate the internal combustion engine with gaseous fuel, while the gas mass flow via the pilot valve allows a comparatively low gas mass flow which is only used to reduce the gas pressure difference across the high-pressure shutoff valve. The gas mass flow which flows through the pilot valve fills a high-pressure chamber of the pressure reducer with gaseous fuel until a pressure difference across the high-pressure shutoff valve is so low that it falls below a selectable gas pressure difference or the pressure difference upstream and downstream of the high-pressure shutoff valve is equalized. An electromagnetic actuation of the pilot and main valves takes place preferably by means of the same electromagnet, with the electromagnetic force acting on the pilot and main valves at the same time. The electromagnet opens first the pilot valve and then the main valve if the reduced pressure difference allows this.

The method according to an embodiment of the invention is characterized essentially in that, in order to assume operation of the internal combustion engine with gaseous fuel or during a switchover from liquid fuel mode to gaseous fuel mode in an internal combustion engine, which can be operated in a bivalent (or monovalent-plus) manner, controlled by the electronic control device, the pilot valve of the high-pressure shutoff valve is opened in chronological order before the at least one gas injection valve.

Correspondingly, in order to carry out the method according to an embodiment of the invention, the electronic control device is set up to control the operation of the internal combustion engine arrangement in such a manner that, in order to assume operation of the internal combustion engine with gaseous fuel, for example during a switchover from liquid fuel mode to gaseous fuel mode in an internal combustion engine which can be operated in a bivalent (or monovalent-plus) manner, controlled by the electronic control device, the pilot valve of the high-pressure shutoff valve is opened in chronological order before the at least one gas injection valve.

In this manner an increase in the gas pressure of the gaseous fuel downstream of the high-pressure shutoff valve can advantageously be achieved by opening the pilot valve of the high-pressure shutoff valve when the at least one gas injection valve is still closed (and the main valve of the high-pressure shutoff valve is likewise still closed), so that a gas pressure difference across the high-pressure shutoff valve can be equalized or can at least fall below a selectable gas pressure difference. That is, an increase in gas pressure downstream of the high-pressure shutoff valve can take place in the fluid-conducting connection between the high-pressure shutoff valve and the high-pressure chamber of the pressure reducer even with a comparatively high pressure difference across the high-pressure shutoff valve and/or with low gas pressure in the gas tank merely by opening the pilot valve when the at least one gas injection valve is still closed.

It can thus be ensured by the method according to an embodiment of the invention that the main valve of the high-pressure shutoff valve can be opened, for example by electromagnetic actuation, and that a motor vehicle which is equipped with an internal combustion engine arrangement according to the invention takes on gas when assuming gaseous fuel mode, in particular when switching over from liquid fuel mode to gaseous fuel mode.

In the method according to an embodiment of the invention, the at least one gas injection valve is opened after the pilot valve of the high-pressure shutoff valve by means of the electronic control device, which is configured in a suitable manner, in such a manner that it is possible for a pressure equalization to take place between the gas pressure of the gaseous fuel present on the input and output sides of the high-pressure shutoff valve or for the pressure difference to fall below a selectable gas pressure difference between the gas pressure of gaseous fuel on the input and output sides of the high-pressure shutoff valve.

The time span after which the at least one gas injection valve is opened after the pilot valve of the high-pressure shutoff valve depends on the respective layout, in particular on the volume of the low-pressure system.

It is for example possible for a constant time span to be preset in the electronic control device when assuming the gaseous fuel mode, in particular when switching over from liquid fuel mode to gaseous fuel mode, after the expiry of which the at least one gas injection valve is opened in chronological order after the pilot valve of the high-pressure shutoff valve. Similarly, it is possible in the method for the at least one gas injection valve to be opened in chronological order after the pilot valve of the high-pressure shutoff valve if a pressure equalization has taken place between the gas pressure of gaseous fuel which is present on the input and output sides of the high-pressure shutoff valve or the pressure difference has fallen below a selectable gas pressure difference.

To this end, gas pressure sensors can be provided in the internal combustion engine arrangement according to an embodiment of the invention upstream of the high-pressure shutoff valve and downstream of the high-pressure shutoff valve, which gas pressure sensors are each connected to the electronic control device and detect the gas pressure of gaseous fuel upstream and downstream of the high-pressure shutoff valve. A gas pressure difference between the gas pressure of gaseous fuel present on the input and output sides of the high-pressure shutoff valve can be determined by means of the electronic control device so that an opening of the pilot valve of the high-pressure shutoff valve and of the at least one gas injection valve can be controlled by means of the electronic control device in chronological order when the pressure ratios upstream and downstream of the high-pressure shutoff valve have appeared in the above-described manner.

Compressed Natural Gas (CNG) can for example be used to operate the internal combustion engine arrangement with gaseous fuel. To operate the internal combustion engine arrangement with an internal combustion engine which can be operated in a bivalent (or monovalent-plus) manner with liquid fuel and gaseous fuel, in which the internal combustion engine arrangement is equipped with both a liquid fuel filling system and a gaseous fuel filling system, as well as the respective feed and metering devices for feeding and metering the respective fuel types to the internal combustion engine, so that a switchover can be made as required to operation with one of the two fuel types manually or automatically by means of an electronic control device, Compressed Natural Gas (CNG) can for example be used as the gaseous fuel and gasoline can for example be used as the liquid fuel.

In the internal combustion engine arrangement according to an embodiment of the invention, an oil separator device for separating liquid or gaseous oil constituents in the gaseous fuel can be arranged downstream of the pressure reducer in its low-pressure system. In this case, the method according to an embodiment of the invention can be used in a particularly advantageous manner, since the fluid-conducting volume in the low-pressure system of the high-pressure shutoff valve is considerably increased.

The embodiments of the invention also extend to a motor vehicle which is equipped with an internal combustion engine arrangement as described above.

Furthermore, the embodiments of the invention extends to an electronic control device for an internal combustion engine arrangement according to the invention as described above, which is suitable for controlling the operation of the internal combustion engine arrangement in such a manner that a method according to an embodiment of the invention as described above is carried out.

Furthermore, the embodiments of the invention extends to a machine-readable program code for an electronic control device according to the invention, which is described above, is suitable for data processing and contains control commands, which prompt the control device according to an embodiment of the invention to carry out a method according to an embodiment of the invention as described above.

Furthermore, the embodiments of the invention extends to a storage medium with a machine-readable program code according to an embodiment of the invention as described above which is stored thereon.

BRIEF DESCRIPTION OF THE DRAWINGS

The present invention will hereinafter be described in conjunction with the following drawing figures, wherein like numerals denote like elements, and FIG. 1 shows a schematic representation of the structure of an exemplary embodiment of the internal combustion engine arrangement according to an embodiment of the invention.

DETAILED DESCRIPTION

The following detailed description is merely exemplary in nature and is not intended to limit application and uses. Furthermore, there is no intention to be bound by any theory presented in the preceding background or summary or the following detailed description.

Accordingly, a preferred exemplary embodiment of the internal combustion engine arrangement according to the invention, which is preferably used in a motor vehicle, comprises a high-pressure shutoff valve, which is known per se, is illustrated merely schematically here, is referred to as a whole with the reference numeral 1 and which is connected on the input side in a fluid-conducting manner via a gaseous fuel line 3 to a gaseous fuel container 2. The gaseous fuel container 2 is provided in the customary manner with a shutoff valve 4, from which the gaseous fuel line 3 which is connected on the input side to the high-pressure shutoff valve branches off.

The high-pressure shutoff valve 1, which comprises a valve body 23 and a valve housing section 24 which is placed thereon, is configured in the form of a main valve with an integrated pilot valve. To this end, the valve body 23 forms a main valve seat 15 in a cut-out 57. A flow duct 22 opens into the cut-out 57, with the mouth of the flow duct 22 being surrounded by the main valve seat 15.

A movable main valve element 17 sits in the cut-out 57, spring-loads the main valve seat 15 in a fluid-tight manner by the spiral spring 19, as a result of which the closed position of the high-pressure shutoff valve 1 is defined. The main valve element 17 can be raised electromagnetically from the main valve seal seat 15 counter to the spring force of the spiral spring 19, as a result of which the mouth of the flow duct 22 is opened. The high-pressure shutoff valve 1 is connected on the input side via a flow duct 20 to the gaseous fuel line 3, which is connected to the gaseous fuel container 2. The flow duct 20 is connected on the other side to the flow duct 22, with a fluid-conducting connection between the flow duct 20 and the flow duct 22 being opened when the main valve element 17 is raised from its main valve seal seat 15. The structure and function of an electromagnetic actuation mechanism for raising the main valve element 17 from its main valve seal seat 15 is known to the person skilled in the art, so an illustrative drawing and a more detailed explanation are not necessary.

The flow duct 22 opens at its end which faces away from the main valve seal seat into an output of the high-pressure shutoff valve 1 so that the input and the output of the high-pressure shutoff valve 1 are connected to each other in a fluid-conducting manner and the high-pressure shutoff valve 1 is in its open position when the main valve element 17 is raised from its main valve seal seat 15. The cross-sectional area of the flow duct 22, which is surrounded by the main valve seal seat 15 defines the opening area, that is, the cross-sectional area of the main valve which is effectively available to the gas flow at the main valve seal seat.

In order to form the pilot valve, a through-bore 25 is formed in the main valve element 17, which through-bore opens into a cut-out 26 in the main valve element 17 and into the flow duct 22. The through-bore 25 can be closed or opened by an electromagnetically movable pilot valve element 18. The structure and function of such an electromagnetic actuation mechanism for moving the pilot valve element 18 is known to the person skilled in the art, so an illustrative drawing and a more detailed explanation are not necessary.

The through-bore 25 in the pilot valve element 18 is connected in terms of flow by means of a lateral bore 21 in the pilot valve element 18 to the flow duct 20. If the pilot valve element 18 is electromagnetically pulled out of the through-bore 25 until the lateral bore 21 is opened, a fluid-conducting connection is created between the flow duct 20 and the flow duct 22. The cross-sectional area of the through-bore 25 in its mouth in the cut-out 26 defines the opening area, that is, the cross-sectional area of the pilot valve, which is effectively available to the gas flow at the pilot valve seal seat.

Since the opening area of the main valve is essentially greater than the opening area of the pilot valve, a correspondingly greater gas mass flow can be transported via the open main valve than via the open pilot valve. Similarly, correspondingly less force is required to open the pilot valve than to open the main valve.

It should be mentioned merely for the sake of completeness that the illustrated and described high-pressure shutoff valve 1 is not restricted to the configuration shown, but can be replaced by another high-pressure shutoff valve which comprises a main valve with a greater opening area and a control valve with a smaller opening area.

The flow duct 22 is connected on the output side of the high-pressure shutoff valve 1 to a gaseous fuel line 5, which for its part is connected in a fluid-conducting manner to the high-pressure-side input of a pressure reducer which is referred to as a whole with the reference numeral 6.

The multi-stage pressure reducer 6, which is shown merely schematically in FIG. 1 and is known per se, has three pressure chambers which are connected to each other by means of respective membrane pressure regulation valves and are namely an input-side high-pressure chamber 27, an output-side low-pressure chamber 29 and an intermediate pressure chamber 28 which is arranged between them and in which a high, low or intermediate gas pressure can be set in a manner regulated by the membrane pressure regulation valves.

The pressure reducer 6 is connected with its high-pressure chamber 27 on the input side to the gaseous fuel line 5, which is connected in a fluid-conducting manner to the output of the high-pressure shutoff valve 1 and through which gaseous fuel can be fed to the high-pressure chamber 27. The high-pressure chamber 27 and the intermediate pressure chamber 28 are connected to each other by means of a membrane pressure regulation valve which is known per se and comprises a membrane 30, which is acted upon by the gas pressure and forms a wall which is common to both chambers, and a valve cone 31, which is connected to the membrane 30. The valve cone 31 is pressed by the spring force of a spring 32 on the opening of a flow duct 33 which connects the high-pressure chamber 27 in a fluid-conducting manner to the intermediate pressure chamber 28, penetrates said flow duct 33 and closes the flow duct 33 in a fluid-tight manner. At a selectable gas pressure in the high-pressure chamber 27, the membrane 30 bulges in toward the intermediate pressure chamber 28, as a result of which the valve cone 31 is pulled out of the flow duct 33, the opening of the flow duct 33 is opened and thus a fluid-conducting connection is made possible between the high-pressure chamber 27 and the intermediate pressure chamber 28. Owing to the throttle effect of the flow duct 33, the high gas pressure prevailing in the high-pressure chamber 27 is reduced to a lower gas pressure in the intermediate pressure chamber 28. Similarly, the intermediate pressure chamber 28 is connected to the low-pressure chamber 29 by means of a correspondingly constructed membrane pressure regulation valve with a membrane 34, valve cone 35, spring 37 and flow duct 36, with a further reduction of the gas pressure relative to the gas pressure in the intermediate pressure chamber taking place.

The pressure reducer shown in FIG. 1 is shown and described merely as an example and can be replaced by another pressure reducer known to the person skilled in the art, by means of which the gas pressure of the gaseous fuel can be reduced. Such a pressure reducer can in particular have a greater or lesser number of pressure stages than the pressure reducer shown in FIG. 1.

The low-pressure chamber 29 is connected on the output side of the pressure reducer 6 to a gaseous fuel line 7, which is connected in a fluid-conducting manner to the input of an oil separator, which is shown merely schematically in FIG. 1 and is referred to as a whole with the reference numeral 8.

The gaseous fuel which is fed through the gaseous fuel line 7 into the oil separator 8 first enters a cavity 38, which is formed by a housing section 43, is deflected through approximately 90° against gravity and emerges from the cavity 38 through an opening 39.

The deflection of the gas flow in the cavity 38 means that liquid oil constituents in the gaseous fuel can be separated owing to the effect of gravity and can flow through openings 42 formed in the housing section 43 into a first oil reservoir 45, which is fastened to the housing section 43. The oil collects as an oil puddle 46 in the cavity 44 of the first oil reservoir 45 at the deepest point, for example on the bottom, of the oil reservoir 45.

The gas flow which emerges from the cavity 38 of the housing section 43 reaches a filter section 52, which is fastened to the housing section 43 and in which are accommodated for example filter units 41, which contain fleece membranes and delimit different cavities from each other. The filter units 41 thus delimit a cavity 40 and a cavity 53 from each other, as well as the cavity 53 from the cavity 54. In the exemplary embodiment shown, the cavities 40 and 54 are identical owing to the rotational symmetry of the separation element. As shown in the example, the gaseous fuel, which flows into the cavity 40 flows through a filter unit 41 into the cavity 53, with it being possible to filter out oil constituents remaining in the gaseous fuel for example in aerosol form by means of the filter unit 41. The filtered out oil is then conducted via a connection line 47 which connects the cavity 53 in a fluid-conducting manner to a second oil reservoir 48 into the cavity 49, which is formed by the oil reservoir 48 and collects as an oil puddle 50 at the deepest point, for example the bottom of the second oil reservoir 48.

The gaseous fuel is conducted via a flow duct 51, which enters the cavity 53 from the cavity 53 out of the oil separator 8.

The oil separator shown in FIG. 1 is shown and described merely as an example and can be replaced by another oil separator known to the person skilled in the art for separating liquid to aerosol-like oil constituents out of a gaseous fuel flow.

The oil separator 8, or more precisely its flow duct 51, is connected on the output side to a gaseous fuel line 9 which opens into a gaseous fuel rail 10. At the end of the gaseous fuel rail 10 are arranged four controllable gas injectors 11 (gas injection valves), by means of which gaseous fuel can be injected into an intake (not shown in FIG. 1) of an internal combustion engine (not shown in FIG. 1). Such gas injectors 11, which can be controlled for example electromagnetically, are known per se and therefore do not have to be explained in more detail here. The number of gas injectors depends on the number of cylinders in the internal combustion engine, and it should be mentioned merely for the sake of completeness that the number of the gas injectors is not restricted to 4 but depends on the specific layout of the internal combustion engine.

Furthermore, a control unit 12 is provided, which can be what is known as an Electronic Control Unit (ECU) which is used to control the engine. The control unit 12 is connected in an electrically conductive manner by means of a data line 13 to the high-pressure shutoff valve 1 and by means of a branching control line 14 to each of the gas injectors 11, so that control currents can be exchanged between the control unit 12 and the high-pressure shutoff valve 1 on the one hand, and between the control unit 12 and each of the gas injectors 11 on the other hand. The data and control lines 13, 14 can be part of what is known as the CAN bus, a central data bus in a motor vehicle, so that the data signals can be exchanged in CAN bus format. The control unit 12 is used to control the high-pressure shutoff valve 1 and defines its opening time and duration. Furthermore, the control unit 12 controls each of the gas injectors 11 and defines their opening times and durations.

In the exemplary embodiment of FIG. 1, the control unit 12 is configured in such a manner that, in order to start operation of the internal combustion engine arrangement with gaseous fuel or to switch over from liquid fuel mode to gaseous fuel mode in an internal combustion engine which can be operated in a bivalent (or monovalent-plus) manner, the pilot valve of the high-pressure shutoff valve 1 is opened before the gas injectors 11 so that, even before gaseous fuel can pass through the gas injectors 11, the high-pressure chamber 27 of the pressure reducer 6 is filled with gaseous fuel and a pressure difference equalization of the gas pressure of gaseous fuel can take place upstream and downstream of the high-pressure shutoff valve 1. It is likewise possible for the pilot valve of the high-pressure shutoff valve 1 to be opened before the gas injectors 11 until a pressure difference of the gas pressure of gaseous fuel upstream and downstream of the high-pressure shutoff valve 1 falls below a selectable threshold value for the pressure difference. The control unit 12 can be set up in such a manner that the gas injectors 11 are opened after the expiry of a selectable time after the opening of the pilot valve of the high-pressure shutoff valve 1. Similarly, the control unit 12 can be set up in such a manner that the gas injectors 11 are opened after opening the pilot valve of the high-pressure shutoff valve 1, if a pressure equalization of the gas pressure of gaseous fuel upstream and downstream of the high-pressure shutoff valve 1 has been carried out or if a pressure difference of the gas pressure of gaseous fuel upstream and downstream of the high-pressure shutoff valve 1 has fallen below a selectable threshold for the pressure difference. In order to detect the pressure difference of the gas pressure of gaseous fuel upstream and downstream of the high-pressure shutoff valve 1, a pressure sensor 55, 56 is arranged in each case in the gaseous fuel line 3 upstream of the high-pressure shutoff valve 1 and in the gaseous fuel line 5 downstream of the high-pressure shutoff valve 1, by means of which pressure sensors the gas pressure of gaseous fuel in the associated gaseous fuel lines 3, 5 can be detected. The pressure sensors 55, 57 are connected in terms of data by means of data lines 58, 59 to the control unit 12 so that the detected gas pressure values can be fed to the control unit 12. From this, the control unit 12 determines a pressure difference of the gas pressure of gaseous fuel upstream and downstream of the high-pressure shutoff valve 1 and actuates the pilot valve of the high-pressure shutoff valve 1 and the gas injectors 11 correspondingly, as described above.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

The invention claimed is:

1. An internal combustion engine arrangement, comprising:
   an internal combustion engine that can be operated with a gaseous fuel;
   a pressure reducer adapted to reduce a gas pressure of the gaseous fuel that is fed to the internal combustion engine;
   a first gaseous fuel line coupling the pressure reducer in a fluid-conducting manner on a high-pressure side to a gas tank adapted to store the gaseous fuel;
   a second gaseous fuel line coupling the pressure reducer in the fluid-conducting manner on a low-pressure side to a controllable gas injection valve adapted to regulate a gas flow of the gaseous fuel that is fed to the internal combustion engine;
   a controllable high-pressure shutoff valve that is arranged on the high-pressure side of the pressure reducer and coupled in the fluid-conducting manner to the pressure reducer and adapted to shut off the gas flow of the gaseous fuel that is fed from the gas tank to the pressure reducer, the controllable high-pressure shutoff valve comprising a pilot valve with a relatively small opening cross-sectional area and a main valve with a relatively large opening cross-sectional area; and
   an electronic control device that adapted to control the controllable high-pressure shutoff valve and the controllable gas injection valve,
   wherein, in order to assume operation of the internal combustion engine with the gaseous fuel or during a switchover from liquid fuel mode to gaseous fuel mode in the internal combustion engine that can be operated in a bivalent manner, controlled by the electronic control device, the pilot valve of the controllable high-pressure shutoff valve is opened in a chronological order before the controllable gas injection valve.

2. An internal combustion engine arrangement according to claim 1, wherein the controllable gas injection valve is opened according to a plurality of selectable time spans in the chronological order after the pilot valve of the controllable high-pressure shutoff valve.

3. An internal combustion engine arrangement according to claim 1, wherein the controllable gas injection valve is opened in the chronological order after the pilot valve of the controllable high-pressure shutoff valve when detected with a pressure sensor that a gas pressure difference of a gaseous fuel upstream of the controllable high-pressure shutoff valve and a gaseous fuel downstream of the controllable high-pressure shutoff valve has been equalized or fallen below a selectable gas pressure difference.

4. An internal combustion engine arrangement according to claim 1, further comprising a bivalent internal combustion engine that can be operated with the gaseous fuel as a first fuel type and a liquid fuel as a second fuel type.

5. An internal combustion engine arrangement for driving a motor vehicle, comprising:

an internal combustion engine that can be operated with a gaseous fuel;

a pressure reducer adapted to reduce a gas pressure of the gaseous fuel that is fed to the internal combustion engine, wherein the pressure reducer is connected in a fluid-conducting manner on a high-pressure side with a gaseous fuel line to a gas tank adapted to store the gaseous fuel, and wherein the pressure reducer is connected in the fluid-conducting manner on a low-pressure side with a second gaseous fuel line to a controllable gas injection valve adapted to regulate a gas flow of the gaseous fuel that is fed to the internal combustion engine;

a controllable high-pressure shutoff valve that is arranged on the high-pressure side of the pressure reducer, connected in the fluid-conducting manner to the pressure reducer, and adapted to shut off the gas flow of the gaseous fuel that is fed from the gas tank to the pressure reducer, wherein the controllable high-pressure shutoff valve comprises a pilot valve with a relatively small opening cross-sectional area and a main valve with a relatively large opening cross-sectional area; and an electronic control device that is adapted to control the controllable high-pressure shutoff valve and the controllable gas injection valve, wherein the electronic control device is adapted to control an operation of the internal combustion engine in such a manner that in order to assume operation of the internal combustion engine with the gaseous fuel or during a switchover from a liquid fuel mode to a gaseous fuel mode in the internal combustion engine that can be operated in a bivalent manner, controlled by the electronic control device, the pilot valve of the controllable high-pressure shutoff valve is opened in a chronological order before the controllable gas injection valve.

6. An internal combustion engine arrangement according to claim 5, wherein the electronic control device is adapted to control an operation of the internal combustion engine arrangement such that the controllable gas injection valve is opened according to selectable time spans in the chronological order after the pilot valve of the controllable high-pressure shutoff valve.

7. An internal combustion engine arrangement according to claim 5, wherein the electronic control device is adapted to control an operation of the internal combustion engine such that the controllable gas injection valve is opened in the chronological order after the pilot valve of the controllable high-pressure shutoff valve when detected with a pressure sensor that a gas pressure difference of a gaseous fuel upstream of the controllable high-pressure shutoff valve and a gaseous fuel downstream of the controllable high-pressure shutoff valve has been equalized or has fallen below a selectable gas pressure difference.

8. An internal combustion engine arrangement according to claim 5, wherein the gaseous fuel is Compressed Natural Gas (CNG).

9. An internal combustion engine arrangement according to claim 5, wherein an oil separator device that is adapted to separate a liquid oil constituent or a gaseous oil constituent in the gaseous fuel is arranged in the low-pressure side of the pressure reducer.

10. An internal combustion engine arrangement according to claim 5, wherein a pressure sensor adapted to detect the gas pressure of the gaseous fuel upstream and the gaseous fuel downstream of the controllable high-pressure shutoff valve are arranged in each case upstream of the controllable high-pressure shutoff valve and downstream of the controllable high-pressure shutoff valve.

11. An internal combustion engine arrangement according to claim 5, wherein the internal combustion engine is adapted to operate with the gaseous fuel as a first fuel type and a liquid fuel as a second fuel type.

12. An internal combustion engine arrangement according to claim 11, wherein the electronic control device is adapted to control the operation of the internal combustion engine such that when the switchover of the operation of the internal combustion engine is made from operation with the second fuel type to operation with the first fuel type, the pilot valve of the controllable high-pressure shutoff valve is opened in the chronological order before the controllable gas injection valve.

13. The internal combustion engine arrangement according to claim 11, wherein the first fuel type is Compressed Natural Gas (CNG) and the second fuel type is gasoline.

14. A method of operating an internal combustion engine that is operable in a bivalent manner with at least a gaseous fuel, comprising the steps of:

reducing a gas pressure of the gaseous fuel that is fed to the internal combustion engine with a pressure reducer;

regulating a gas flow of the gaseous fuel fed to the internal combustion engine with a controllable gas injection valve that is coupled to the pressure reducer with a gaseous fuel line on a low-pressure side and on a high-pressure side a second gaseous fuel line that couples the pressure reducer to a gas tank adapted to store the gaseous fuel;

shutting off the gas flow of the gaseous fuel that is fed from the gas tank to the pressure reducer with a controllable high-pressure shutoff valve that is arranged on the high-pressure side of the pressure reducer and coupled in a fluid-conducting manner to the pressure reducer, the controllable high-pressure shutoff valve comprising a pilot valve with a relatively small opening cross-sectional area and a main valve with a relatively large opening cross-sectional area; and opening the pilot valve of the controllable high-pressure shutoff valve in a chronological order before the controllable gas injection valve with an electronic control device in order to assume operation of the internal combustion engine with the gaseous fuel or during a switchover from liquid fuel mode to gaseous fuel mode in the internal combustion engine.

15. The method according to claim 14, further comprising the step of opening the controllable gas injection valve according to selectable time spans in the chronological order after the pilot valve of the controllable high-pressure shutoff valve.

16. The method according to claim 14, further comprising the step of controlling an operation of the internal combustion engine in such a manner that the controllable gas injection valve is opened in the chronological order after the pilot valve of the controllable high-pressure shutoff valve when detected with a pressure sensor that a gas pressure difference of a gaseous fuel upstream of the controllable high-pressure shutoff valve and a gaseous fuel downstream of the controllable high-pressure shutoff valve has been equalized or has fallen below a selectable gas pressure difference.

17. The method according to claim 14, wherein the gaseous fuel is Compressed Natural Gas (CNG).

18. The method according to claim 14, further comprising the step of separating a liquid oil constituent or a gaseous oil constituent in the gaseous fuel with an oil separator device that is arranged in the low-pressure of the pressure reducer.

19. The method according to claim 14, further comprising the step of detecting with a sensor the gas pressure of the gaseous fuel upstream and the gaseous fuel downstream of the controllable high-pressure shutoff valve are arranged in each case upstream of the controllable high-pressure shutoff valve and downstream of the controllable high-pressure shutoff valve.

20. The method according to claim 14, further comprising the step of operating the internal combustion engine with the gaseous fuel as a first fuel type and a liquid fuel as a second fuel type.

21. The method according to claim 20, further comprising the step of controlling the operation of the internal combustion engine with the electronic control device in such a manner that when the switchover of the operation of the internal combustion engine is made from operation with the second fuel type to operation with the first fuel type, the pilot valve of the controllable high-pressure shutoff valve is opened in the chronological order before the controllable gas injection valve.

22. The method to claim 20, wherein the first fuel type is Compressed Natural Gas (CNG) and the second fuel type is gasoline.

23. A computer readable medium embodying a computer program product, said computer program product comprising:
an internal combustion engine program, the internal combustion engine program configured to:
operate an internal combustion engine operable in a bivalent manner with at least a gaseous fuel;
reduce a gas pressure of the gaseous fuel that is fed to the internal combustion engine with a pressure reducer;
regulate a gas flow of the gaseous fuel fed to the internal combustion engine with a controllable gas injection valve that is coupled to the pressure reducer with a gaseous fuel line on a low-pressure side and on a high-pressure side a second gaseous fuel line that couples the pressure reducer to a gas tank adapted to store the gaseous fuel;
shut off the gas flow of the gaseous fuel that is fed from the gas tank to the pressure reducer with a controllable high-pressure shutoff valve that is arranged on a high-pressure side of the pressure reducer and coupled in a fluid-conducting manner to the pressure reducer, the controllable high-pressure shutoff valve comprising a pilot valve with a relatively small opening cross-sectional area and a main valve with a relatively large opening cross-sectional area; and
open the pilot valve of the controllable high-pressure shutoff valve in a chronological order before the controllable gas injection valve with an electronic control device in order to assume operation of the internal combustion engine with the gaseous fuel or during a switchover from liquid fuel mode to gaseous fuel mode in the internal combustion engine.

24. The computer readable medium embodying the computer program product according to claim 23, wherein the internal combustion engine program is configured to open the controllable gas injection valve according to selectable time spans in the chronological order after the pilot valve of the controllable high-pressure shutoff valve.

25. The computer readable medium embodying the computer program product according to claim 23, wherein the internal combustion engine program is further configured to control an operation of the internal combustion engine in such a manner that the controllable gas injection valve is opened in a chronological order after the pilot valve of the controllable high-pressure shutoff valve when detected with a pressure sensor that a gas pressure difference of a gaseous fuel upstream of the high-pressure shutoff valve and a gaseous fuel downstream of the controllable high-pressure shutoff valve has been equalized or has fallen below a selectable gas pressure difference.

26. The computer readable medium embodying the computer program product according to claim 23, wherein the gaseous fuel is Compressed Natural Gas (CNG).

27. The computer readable medium embodying the computer program product according to claim 23, wherein the internal combustion engine program is further configured to separate a liquid oil constituent or a gaseous oil constituent in the gaseous fuel with an oil separator device that is arranged in the low-pressure side of the pressure reducer.

28. The computer readable medium embodying the computer program product according to claim 23, wherein the internal combustion engine program is further configured to detect with a sensor the gas pressure of the gaseous fuel upstream and the gaseous fuel downstream of the controllable high-pressure shutoff valve are arranged in each case upstream of the controllable high-pressure shutoff valve and downstream of the controllable high-pressure shutoff valve.

29. The computer readable medium embodying the computer program product according to claim 23, wherein the internal combustion engine program is further configured to operate the internal combustion engine with the gaseous fuel as a first fuel type and a liquid fuel as a second fuel type.

30. The computer readable medium embodying the computer program product according to claim 29, wherein the internal combustion engine program is further configured to control the operation of the internal combustion engine with the electronic control device in such a manner that when the switchover of the operation of the internal combustion engine is made from operation with the second fuel type to operation with the first fuel type, the pilot valve of the controllable high-pressure shutoff valve is opened in the chronological order before the controllable gas injection valve.

31. The computer readable medium embodying the computer program product according to claim 29, wherein the first fuel type is Compressed Natural Gas (CNG) and the second fuel type is gasoline.

* * * * *